United States Patent
Bannai et al.

(10) Patent No.: US 7,922,316 B2
(45) Date of Patent: Apr. 12, 2011

(54) INKJET RECORDING APPARATUS AND INKJET RECORDING METHOD

(75) Inventors: Akiko Bannai, Tokyo (JP); Eisuke Hori, Tokyo (JP); Akihiko Gotoh, Atsugi (JP); Kiyofumi Nagai, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 654 days.

(21) Appl. No.: 11/718,293

(22) PCT Filed: Oct. 26, 2005

(86) PCT No.: PCT/JP2005/020052
§ 371 (c)(1), (2), (4) Date: Aug. 2, 2007

(87) PCT Pub. No.: WO2006/046747
PCT Pub. Date: May 4, 2006

(65) Prior Publication Data
US 2008/0094458 A1   Apr. 24, 2008

(30) Foreign Application Priority Data
Oct. 28, 2004 (JP) ................. 2004-314856

(51) Int. Cl.
*C09D 11/00* (2006.01)
(52) U.S. Cl. .................... 347/100; 106/31.13
(58) Field of Classification Search ............ 347/100; 106/31.13
See application file for complete search history.

(56) References Cited

U.S. PATENT DOCUMENTS

| 4,503,444 | A | * | 3/1985 | Tacklind | 347/11 |
| 5,658,376 | A | * | 8/1997 | Noguchi et al. | 106/31.43 |
| 5,992,978 | A | * | 11/1999 | Fujii et al. | 347/54 |
| 6,042,224 | A | * | 3/2000 | Oda et al. | 347/86 |
| 2003/0076394 | A1 | * | 4/2003 | Gotoh et al. | 347/100 |
| 2003/0107632 | A1 | * | 6/2003 | Arita et al. | 347/100 |
| 2004/0024084 | A1 | | 2/2004 | Beach et al. | |
| 2005/0231575 | A1 | * | 10/2005 | Bannai et al. | 347/100 |
| 2007/0221079 | A1 | * | 9/2007 | Aruga et al. | 101/327 |

FOREIGN PATENT DOCUMENTS

| EP | 0 654 511 A1 | 5/1995 |
| EP | 0 859 037 A1 | 8/1998 |
| EP | 1 125 992 A2 | 8/2001 |
| EP | 1 262 529 A1 | 12/2002 |
| JP | 7 90210 | 4/1995 |
| JP | 9 111166 | 4/1997 |
| JP | 10 330661 | 12/1998 |

(Continued)

OTHER PUBLICATIONS

U.S. Appl. 12/015,787, filed Jan. 17, 2008, Hori, et al.

*Primary Examiner* — Laura E Martin
(74) *Attorney, Agent, or Firm* — Oblon, Spivak, McClelland, Maier & Neustadt, L.L.P.

(57) ABSTRACT

An inkjet recording apparatus is provided, wherein the inkjet recording apparatus contains a recording head with a filter, an ink that comprises a colorant, a humectant, a surfactant, and a wetting agent is discharged from the recording head, the viscosity of the ink at 25° C. is 6 mPas to 13 mPas, and the fluid resistance of the filter against the ink is $4.4 \times 10^9$ Pas/m$^3$ and $2.2 \times 10^{10}$ Pas/m$^3$.

15 Claims, 5 Drawing Sheets

FOREIGN PATENT DOCUMENTS

| | | |
|---|---|---|
| JP | 2000 95983 | 4/2000 |
| JP | 3168122 | 3/2001 |
| JP | 2001 262025 | 9/2001 |
| JP | 3267457 | 1/2002 |
| JP | 2002 273881 | 9/2002 |
| JP | 2002 337449 | 11/2002 |
| JP | 3389732 | 1/2003 |
| JP | 2004 59913 | 2/2004 |
| WO | WO 2005/097921 A1 | 10/2005 |
| WO | WO 2005097921 A1 * | 10/2005 |

* cited by examiner

INKJET RECORDING APPARATUS AND INKJET RECORDING METHOD

TECHNICAL FIELD

The present invention relates to an inkjet recording apparatus and an inkjet recording method that employ an ink that provides superior image quality and high-speed printing ability on regular paper, as well as favorable storage stability and discharging stability.

BACKGROUND ART

Recently, inkjet printers have been rapidly developing their market owing to their features such as printability on regular paper, easy colorization, compact size, inexpensive price, and low running cost.

Typical properties required for inkjet recording ink are as follows: color tone, image density and bleeding to achieve high image quality; dissolution or dispersion stability, preservation stability, and discharge stability of colorant in the ink to achieve reliability; water resistance and light resistance to secure the storage life of recorded images; rapid drying of ink to achieve high-speed printing. Various improvements have been proposed heretofore in order to satisfy these requirements.

Initially, colorants of the inkjet recording ink were mainly based on dyes owing to their bright coloration and high reliability; recently, ink components containing pigments such as carbon black have gained attention for the purpose of making the recorded images light- and water-resistant.

Further, the recent trend is to make the size of ink drops smaller in order to achieve high-quality images and high-speed printing; therefore, the nozzle diameter also tends to be reduced.

However, it is considerably difficult to assure discharging stability of printers when pigments are employed as their colorant and printers are equipped with nozzles with smaller diameter. Accordingly, inkjet recording ink that satisfies both these requirement and other ink properties has not been developed yet.

Previous proposals for increasing the reliability of printers include improvements of the long-term preservation stability of the ink (to prevent the formulation of coarse particles due to pigment aggregations) and formulations that suppress as much as possible the increase in the viscosity of the ink when the moisture in the ink has evaporated in the vicinity of the nozzles. In addition, it is proposed to install a filter between the ink supply unit and ink discharge unit in order to prevent dust from being mixed in the ink.

Regarding the formulation of the aforesaid ink, Patent Literature 1, 2 and 3 disclose that the discharging stability is assured by regulating the viscosity when the ink is being condensed; however, with these proposed ink, it is found difficult to ensure the high image quality on regular paper.

In addition, Patent Literature 4 discloses that an ink with high viscosity (5 mPa·s to 15 mPa·s) is required to ensure high image quality. According to this proposal, it is recommended to adjust the initial vaporization speed for assuring reliability, as well as to add specific compounds as viscosity controlling agents for adjusting viscosity. However, no description is present concerning the particle size stability of the pigment, and the reliability is considered inferior in certain configuration of head and nozzle diameter when it is left to stand for a prolonged period.

Further, regarding a filter to be installed between an ink supply unit and ink discharge unit, various proposals have been made for the purpose of preventing external dust, dust within ink, precipitates from ink, and air bubbles from clogging nozzle and ink channel.

For example, Patent Literature 5 discloses a device that prevents air bubbles trapped by a filter that is installed as a means to remove dust from inhibiting the flow of the ink.

Patent Literature 6 makes a proposal to achieve both high definition and high speed. According to this proposal, smaller nozzle diameter is necessary for higher definition of image quality, which as a result requires smaller pore size of the filter for dust removal. This, combined with the increase in the supplied ink quantity due to speeding up, increases the pressure difference around the filter and decreases the maximum ink ejecting frequency. The literature states that this problem can be avoided by contriving the configuration.

Furthermore, Patent Literature 7 discloses that keeping the inertance and the flow resistance of a filter that is to be used within a certain range eliminates the clogging due to inflow of contaminants, relieves and absorbs the pressure generated when ink drops are being discharged, and therefore secures a stable discharge. However, the proposed filter consists of multiple grooves formed by etching on anisotropic crystal base, which lacks versatility. Also, the proposal misses to mention the relationship between the filter and the size and shape of colorant particles in the ink.

Patent Literature 8 points out a possibility that contaminants once trapped by a filter pass through the filter over the long-term usage of a head and repetitive absorption and discharge of ink. The proposal discloses that installing two types of filters may avoid these and hence considerably decrease poor discharge; however, this is not advisable in terms of cost.

Patent Literature 1 Japanese Patent Application Laid-Open (JP-A) No. 2002-337449
Patent Literature 2 JP-A No. 2000-95983
Patent Literature 3 JP-A No. 9-111166
Patent Literature 4 JP-A No. 2001-262025
Patent Literature 5 Japanese Patent (JP-B) No. 3168122
Patent Literature 6 JP-B No. 3267457
Patent Literature 7 JP-B No. 3389732
Patent Literature 8 JP-A No. 2002-273881

DISCLOSURE OF INVENTION

The present invention, in an inkjet recording apparatus equipped with a head that includes a filter as its component, enables to achieve both high image quality and high reliability by adjusting the viscosity of an employed ink at 25° C. between 6 mPa·s and 13 mPa·s, and adjusting the fluid resistance of the filter against the ink between $4.4 \times 10^9$ Pa·s/m$^3$ and $2.2 \times 10^{10}$ Pa·s/m$^3$. Herewith, the discharge stability is ensured because the nozzle does not clog with the external contaminants or precipitants from the ink and because the stable ink supply is possible at high-speed printing.

An ink employed in the present invention comprises essentially a colorant, a humectant, a surfactant, and a wetting agent, and is characterized by the combination and blending ratio of these components adjusted such that the viscosity at 25° C. is 6 mPa·s to 13 mPa·s. In addition, the present invention enables both high image quality and high reliability by adjusting the fluid resistance of a filter employed as a component of a head within the range of $4.4 \times 10^9$ Pa·s/m$^3$ and $2.2 \times 10^{10}$ Pa·s/m$^3$.

In an inkjet recording apparatus of the present invention, an ink that comprises a colorant, a humectant, a surfactant, and a wetting agent is discharged from a head that consists of a filter. The viscosity of the ink is 6 mPa·s to 13 mPa·s, and the fluid resistance of the filter against the ink is $4.4 \times 10^9$ Pa·s/m$^3$ and $2.2 \times 10^{10}$ Pa·s/m$^3$.

Preferably, an ink that is employed by an inkjet recording apparatus of the present invention possesses the following aspects: the ink comprises 3% by mass (hereinafter referred to as mass %) to 15 mass % of colorant and 10 mass % to 40 mass % of humectant; the colorant is a pigment dispersible in water with no dispersant, having at least one kind of hydrophilic group being attached, directly or with other intervening atomic groups, to the surface of the pigment; the ink is a polymer emulsion formed by incorporating water-insoluble or hardly water-soluble color materials into polymer fine particles; the humectant comprises one or more kind of multivalent alcohols that respectively exhibit 25 mass % or more of equivalent moisture at a temperature of 20° C. and a relative humidity of 60%; one of the multivalent alcohols is glycerin, which makes up 20 mass % to 80 mass % of the humectant; the wetting agent comprises at least one polyol that exhibits a solubility of 0.2 mass % to 5.0 mass % in water at 20° C.; the polyol is 2-ethyl-1,3-hexanediol; the polyol is 2,2,4-trimethyl-1,3-pentanediol, the ink consists 2-amino-2-ethyl-1,3-propanediol; a head comprises multiple pressurized liquid chambers, nozzles with pore size no greater than 35 μm which communicate with the liquid chambers, ink supply channels, a transducing unit for ink discharge, a filter, and an ink tank that causes negative pressure.

An inkjet recording method according to the present invention employs the aforementioned inkjet recording apparatus of this present invention, wherein the size of drops discharged from the nozzles is preferably 3 pL to 40 pL, the velocity of the ejected drops is preferably 5 m/sec to 20 m/sec, the driving frequency is preferably 1 kHz or greater, and the resolution is preferably 300 dpi or greater.

Preferably, an inkjet recording method of the present invention provides a feature to merge multiple droplets of continuously discharged ink drops into a larger drop prior to reaching the recording medium.

BEST MODE FOR CARRYING OUT THE INVENTION

Figure 1:
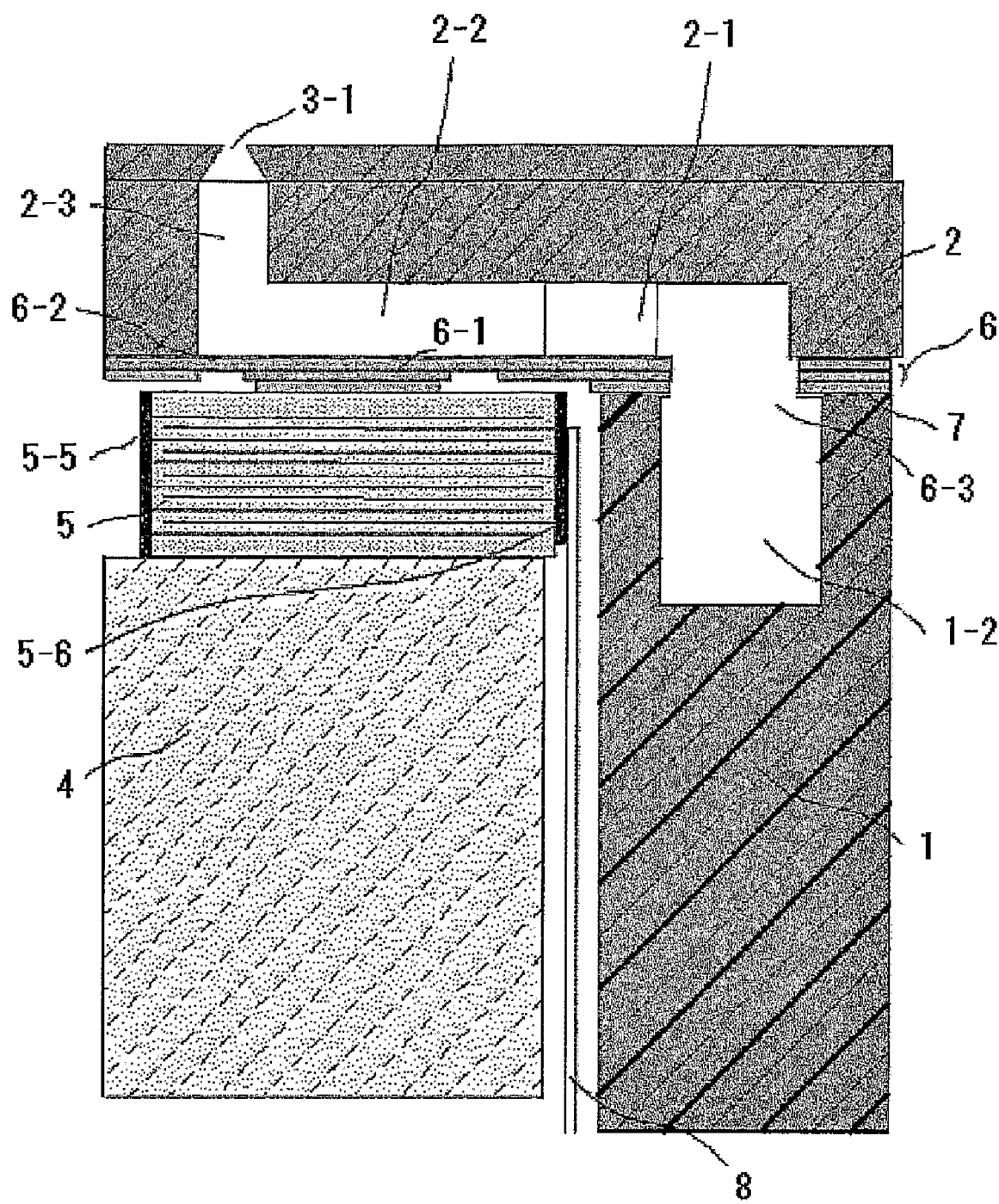
FIG. 1 shows a partially enlarged view of an exemplary inkjet head related to the present invention.

Inkjet Recording Apparatus and Inkjet Recording Method

An inkjet recording apparatus is configured so that an ink that comprises a colorant, a humectant, a surfactant, and a wetting agent is discharged from a head with a filter; any additional means is employed as required.

An inkjet recording method of the present invention is conducted on the inkjet recording apparatus of the present invention, and any additional process is included as required.

Hereinafter, an inkjet recording method of the present invention is detailed through the description of inkjet recording apparatus of the present invention.

<Ink>

The ink comprises a colorant, a humectant, a surfactant, and a wetting agent; any additional component is added as required.

As for the colorant, pigments are mainly employed from the aspect of durability; however, dyes may be combined with pigments in order to adjust the color tone if necessary as long as the durability is maintained.

The pigments may be inorganic or organic, and such pigments may be self-dispersing pigments, dispersions dispersed with surfactant and/or polymer dispersant, emulsion-type pigments, and self-dispersing pigments coated with resin.

The average particle diameter of the pigment is not restricted; however pigment with its average particle diameter ranging preferably from 5 nm and 200 nm, more preferably from 10 nm to 150 nm, most preferably from 10 nm to 100 nm, are used to maintain the reliability. Pigments with average particle diameter of greater than 200 nm tend to clog a filter, and hence the discharging stability may be impaired. On the other hand, when the average particle diameter of the pigments is less than 5 nm, the productivity and the cost-performance decrease, and the aggregation occurs more easily, which may impair the storage stability of the ink.

Here, the term "average particle diameter" indicates a volume-average particle diameter, i.e. the value of cumulative percentage of 50% on a volumetric basis. One method to determine the volume-average particle size is a dynamic light scattering method (or Doppler scattering light analysis), wherein a laser beam is applied to particles in an ink under Brownian motion, and the particle size is determined from the magnitude of the frequency of light returned from the particles (backscattering).

Examples of the inorganic pigments include titanium oxide, iron oxide, calcium carbonate, barium sulfate, aluminum hydroxide, barium yellow, cadmium red, and chrome yellow. Also, carbon blacks manufactured by heretofore known methods such as contact method, furnace method and thermal method can be used.

Examples of the organic pigments are as follows: azo pigments such as azo lakes, insoluble azo pigments, condensed azo pigments, and chelated azo pigments; polycyclic pigments such as phthalocyanine pigments, perylene pigments, perynone pigments, anthraquinone pigments, quinacridone pigments, dioxadine pigments, indigo pigments, thioindigo pigments, isoindolinone pigments, and quinophthalone pigments; dye chelates such as basic dye chelates and acidic dye chelates; nitro pigments, nitroso pigments, aniline black, and the like. Among these, pigments with high affinity for water are preferred in particular.

Specific examples of the black pigments include carbon black (C.I. Pigment Black 7) such as furnace black, acetylene black and channel black; metal and metal compounds such as copper, iron (C.I. Pigment Black 11), and titanium oxide; and organic pigments such as Aniline Black.

Specific examples of the color pigments include C.I. Pigment Yellow 1, 3, 12, 13, 14, 17, 24, 34, 35, 37, 42 (i.e., yellow iron oxide), 53, 55, 74, 81, 83, 95, 97, 98, 100, 101, 104, 108, 109, 110, 117, 120, 128, 138, 150, 151, 153, and 183; C.I. Pigment Orange 5, 13, 16, 17, 36, 43 and 51; C.I. Pigment Red 1, 2, 3, 5, 17, 22, 23, 31, 38, 48:2, 48:2 (Permanent Red 2B (Ca)), 48:3, 48:4, 49:1, 52:2, 53:1, 57:1 (Brilliant Carmine 6B), 60:1, 63:1, 63:2, 64:1, 81, 83, 88, 101 (red iron oxide), 104, 105, 106, 108 (Cadmium Red), 112, 114, 122 (Quinacridone Magenta), 123, 146, 149, 166, 168, 170, 172, 177, 178, 179, 185, 190, 193, 209 and 219; C.I. Pigment Violet 1 (Rhodamine Lake), 3, 5:1, 16, 19, 23 and 38; C.I. Pigment Blue 1, 2, 15, 15:1, 15:2, 15:3 (Phthalocyanine Blue), 16, 17:1, 56, 60 and 63; C.I. Pigment Green 1, 4, 7, 8, 10, 17, 18 and 36; and such.

Preferably, the surface of the pigments is modified such that at least one kind of hydrophilic groups is attached directly, or via other atomic groups, to the surface of the pigments. Specifically, such pigments may be produced by chemically bonding certain functional groups such as sulfone group or carboxyl group to the surface of the pigments, or alternatively, by oxidizing the pigments with hypohalogen acid and/or its salt in a wet condition. A favorable configuration in particular is that carboxyl groups are attached to the surface of the pigments and that the pigments are dispersed in water. Such surface-modified pigments with carboxyl groups enhance dispersion stability and print quality, and also they improve water resistance of the recording medium after printing.

Further, an ink of such configuration affords re-dispersibility after drying. Therefore, without clogging of ink flow, appropriate printing may be carried out by means of a simple cleaning operation even when the ink moisture around the nozzles of an inkjet head has evaporated after a prolonged pause in printing. Moreover, such self-dispersible pigments provide high reliability and high image quality owing to a synergistic effect especially when combined with a surfactant and wetting agent described hereinafter.

In addition to the aforesaid pigments, polymer emulsions may be employed in a configuration such that water-insoluble or hardly water-soluble pigments are contained in polymer fine particles. Polymer emulsions containing pigments may be exemplified by polymer fine particles encapsulating pigments and/or polymer fine particles adsorbing pigments on their surface. In such configurations, the entire pigment is not necessarily required to be encapsulated or adsorbed, but an amount of pigment may be dispersed in the emulsions as long as the effect of the present invention is not impaired.

Examples of the polymer that constitutes polymer emulsion include vinyl polymer, polyester polymer, and urethane polymer; in particular vinyl polymer and polyester polymer are preferred.

Further, in the present invention, such pigments as dispersed in aqueous medium with the aid of dispersants may be combined. Preferable pigments are those heretofore known to be used for the preparation of the known pigment dispersants.

Examples of such pigments include polyacrylic acid, polymethacrylic acid, acrylic acid-acrylonitrile copolymers, vinyl acetate-acrylate copolymers, acrylic acid-acrylic acid alkylester copolymers, styrene-acrylic acid copolymers, styrene-methacrylic acid copolymers, styrene-acrylic acid-acrylic acid alkylester copolymers, styrene-methacrylic acid-acrylic acid alkylester copolymers, styrene-α-methylstyrene-acrylic acid copolymers, styrene-α-methylstyrene-acrylic acid-acrylic acid alkylester copolymers, styrene-maleic acid copolymers, vinylnaphthalene-maleic acid copolymers, vinyl acetate-ethylene copolymers, vinyl acetate-fatty acid vinylester-ethylene copolymers, vinylacetate-maleic acid ester copolymers, vinylacetate-crotonic acid copolymers, vinylacetate-acrylic acid copolymers and the like.

The weight-average molecular weight of these copolymers is preferably 3,000 to 50,000, more preferably 5,000 to 30,000 and most preferably from 7,000 to 15,000.

The amount of the dispersants may be properly determined so that the pigment is stably dispersed as well as the effect of the present invention is not reduced. The ratio of the pigment to the dispersant is preferably between 1/0.06 and 1/3, and more preferably between 1/0.125 and 1/3.

As described above, carboxyl groups are preferably attached to the dispersant of the ink, thereby the dispersion stability, printing quality, and water resistance of the recording medium after printing are improved. In addition to these effects, carboxyl groups may effectively prevent strike-through. In particular, when a pigment dispersed with the aid of dispersant to which carboxyl groups are attached is combined with a wetting agent, sufficient drying rate and less strike-through may be achieved even with a recording medium of high sizing such as regular paper. It is presumably because, due to the relatively low dissociation constants of carboxyl groups compared to other acidic groups, a synergetic effect of a decrease in the pH of the ink and an interaction of the pigment with multivalent metal ions such as calcium ions that exist near the recording medium surface lowers the solubility of the dispersant itself to induce the aggregation of the dispersant and the pigment, followed by an adhesion of pigments to the recording medium.

In the present invention, in addition to the pigments, dyes may be employed.

Specific examples of acidic dyes and food dyes include C.I. Acid Yellow 17, 23, 42, 44, 79 and 142; C.I. Acid Red 1, 8, 13, 14, 18, 26, 27, 35, 37, 42, 52, 82, 87, 89, 92, 97, 106, 111, 114, 115, 134, 186, 249, 254 and 289; C.I. Acid Blue 9, 29, 45, 92 and 249; C.I. Acid Black 1, 2, 7, 24, 26 and 94; C.I. Food Yellow 2, 3 and 4; C.I. Food Red 7, 9 and 14; and C.I. Food Black 1 and 2.

Specific examples of direct dyes include C.I. Direct Yellow 1, 12, 24, 26, 33, 44, 50, 86, 120, 132, 142 and 144; C.I. Direct Red 1, 4, 9, 13, 17, 20, 28, 31, 39, 80, 81, 83, 89, 225 and 227; C.I. Direct Orange 26, 29, 62 and 102; C.I. Direct Blue 1, 2, 6, 15, 22, 25, 71, 76, 79, 86, 87, 90, 98, 163, 165, 199 and 202; and C.I. Direct Black 19, 22, 32, 38, 51, 56, 71, 74, 75, 77, 154, 168 and 171.

Specific examples of basic dyes include C.I. Basic Yellow 1, 2, 11, 13, 14, 15, 19, 21, 23, 24, 25, 28, 29, 32, 36, 40, 41, 45, 49, 51, 53, 63, 65, 67, 70, 73, 77, 87 and 91; C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109 and 112; C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147 and 155; and C.I. Basic Black 2 and 8.

Specific examples of reactive dyes include C.I. Reactive Black 3, 4, 7, 11, 12 and 17; C.I. Reactive Yellow 1, 5, 11, 13, 14, 20, 21, 22, 25, 40, 47, 51, 55, 65 and 67; C.I. Reactive Red 1, 14, 17, 25, 26, 32, 37, 44, 46, 55, 60, 66, 74, 79, 96 and 97; and C.I. Reactive Blue 1, 2, 7, 14, 15, 23, 32, 35, 38, 41, 63, 80 and 95.

Among these dyes, acidic dyes and direct dyes are particularly preferred.

The content of these colorants in the ink is preferably 3 mass % to 15 mass %, more preferably 5 mass % to 12 mass %. When the content of the colorants in the ink is less than 3 mass %, the ink density is low, and the clarity of the printed image may not be ensured with small amount of ink adhesion. On the other hand, when the content of the colorants is greater than 15 mass %, the density of the colorants is too high, which causes the aggregation of the colorants, resulting in poor discharge.

As for humectants, it is preferable for the present invention to employ a component that tends to form hydrogen bond, exhibits high viscosity as a pure substance, and exhibits higher equilibrium moisture content and lower viscosity in the presence of water, in order to obtain an ink that is able to form high quality images.

It is preferable that the humectants comprise one or more kind of multivalent alcohols that respectively exhibit 25 mass % or more of equivalent moisture content at a temperature of 20° C. and a relative humidity of 60%.

Examples of such humectants selected from multivalent alcohols include glycerin, ethylene glycol, diethylene glycol, triethylene glycol, propylene glycol, dipropylene glycol, tripropylene glycol, 3-methyl-1,3-butanediol, 1,3-butanediol, 2,3-butanediol, 1,4-butanediol, 1,5-pentanediol, tetraethylene glycol, 1,6-hexanediol, 2-methyl-2,4-pentanediol, polyethylene glycol, 1,2,4-butanetriol, 1,2,6-hexanetriol and the like. Glycerin provides rapid increase in viscosity with moisture evaporation, but suppresses the aggregation of colorant, and thereby provides a superior effect on suppressing the growth of the particle size. Accordingly, glycerin content is preferably 20 mass % or more of the humectant. Further, glycerin is preferable with respect to its higher equivalent moisture content.

As for the humectants combined with glycerin, 1,3-butanediol and 3-methyl-1,3-butanediol are preferable. Both 1,3-butanediol and 3-methyl-1,3-butanediol have equally high equilibrium moisture contents as glycerin, show high reliability, and afford such effect as spreading evenly the applied picture elements on paper and preserving the ink material on paper surface. In particular, 3-methyl-1,3-butanediol shows the effect of evenly spreading picture elements, and thereby high-quality images may be formed.

While it exhibits a superior effect on enhancing the reliability, glycerin, causing an excessive increase in viscosity following moisture evaporation, reduces the image quality and harms the discharging stability when an excessive amount is added. The blending ratio of these butanediol to glycerin is preferably between 1/4 and 4/1, more preferably between 1/3 and 3/1, most preferably 1/1 and 3/1.

The effects of the present invention may be achieved when the humectant percentage of the total ink is in the range of 10 mass % to 40 mass %, most preferably in the range of 25 mass % to 35 mass %. Insufficient humectant content may impair the storage stability and discharging stability, and likely clog the nozzles. On the other hand, excessive humectant content can affect the drying property, causes bleeding of letters and bleeding of color boundaries, and hence results in poor image quality.

A surfactant and a wetting agent are incorporated into the ink according to the present invention, in order to provide the desired properties described later respectively. A surfactant is employed in the present invention to reduce the static surface tension at around 1,000 milli-seconds (hereinafter referred to as msec) in particular and thereby to facilitate the ink to penetrate into paper at the moment when the ink drops are applied on the paper. On the other hand, a wetting agent employed in the present invention reduces the relatively dynamic surface tension at around 10 msec to 100 msec in particular and thereby to facilitate the ink to spread on the surface of paper at the moment when the ink drops are applied on the paper.

By using a surfactant and a wetting agent in combination, it is possible to achieve an ink with appropriate spread of image elements over paper and with high penetration into paper (hence quick-drying). Accordingly, higher-quality images may be obtained at higher production rate.

The surfactant may be selected from ampholytic surfactants, nonionic surfactants, and anionic surfactants. Preferably, nonionic surfactants such as polyoxyethylene alkylphenylether, polyoxyethylene alkylester, polyoxyethylene alkylamine, polyoxyethylene alkylamide, polyoxyethylene block polymer, sorbitan fatty acid ester, polyoxyethylene sorbitan fatty acid ester, acetylene alcohol of ethyleneoxide additive are employed considering the relation between the dispersion stability of color material and image quality.

Further, fluorochemical surfactants or silicone surfactants may be used alone or in combination depending on the recipe.

Among these, the nonionic surfactants expressed by the following formula (I) are preferable in particular.

where "R" represents a linear or blanched alkyl group with 6 to 14 carbon atoms; "m" represents a positive integer.

In terms of image quality, "R" is preferably an alkyl group with 10 or more carbon atoms; "m" is preferably two to 30, more preferably seven to nine.

The content of the surfactants in the ink is preferably 0.01 mass % to 5.0 mass %, more preferably 0.5 mass % to 3.0 mass %. When the content is less than 0.01 mass %, the effects are insignificant. When the content is more than 5.0 mass %, the penetration into the recording medium is excessively high, and this may cause problems such as decrease in image density and occurrence of strike-through.

Specific examples of the compounds expressed by the above-noted formula (1) include, but not limited to:

These surfactants may be used alone or in combination. A surfactant may dissolve and stably stand with the other surfactants even when it does not easily dissolve in a recording liquid. As for the commercial surfactants that include the above-noted compounds as their main components, BT series from Nikko Chemicals Co. Ltd., SOFTANOL series from Nippon Shokubai Co. Ltd. and DISPANOL from Nippon Yushi Co. Ltd. may be exemplified.

The wetting agent employed in the present invention preferably contains at least one polyol having a solubility of at least 0.2 mass % but no more than 5.0 mass % in water at 20° C. Examples of fatty diol among such polyols include 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol, 2-ethyl-1,3-hexanediol and such.

Among these, 2-ethyl-1,3-hexanediol and 2,2,4-trimethyl-1,3-pentanediol are most preferable.

Examples of other wetting agents possible to be combined include alkyl and aryl ethers of multivalent alcohols such as diethyleneglycol monophenylether, ethyleneglycol monophenylether, ethyleneglycol monoallylether, diethyleneglycol monobutylether, propyleneglycol monobutylether, and tetraethyleneglycol chlorophenylether; and lower alcohols such as ethanol. The wetting agents are not limited to these compounds, provided that they may dissolve in the ink and adjust to the desired properties.

The content of the wetting agent is preferably 0.1 mass % to 4.0 mass %. When the content is less than 0.1 mass %, rapid drying is not achieved, resulting in bleeding images. On the other hand, when the content is more than 4.0 mass %, the dispersion stability of the colorant is reduced, possibly resulting in clogging nozzles, and the penetration into the recording medium exceeds the necessary level, possibly decreasing the image density and causing strike-through.

Examples of ink components other than the essential components are a pH controlling agent, an antiseptic-antifungal agent, a chelating agents and a rust-inhibitor.

The pH controlling agent may be any substance, provided that pH of recording liquid is adjusted within a desired range without causing an adverse effect on the prepared recording liquid.

Examples of the pH controlling agent include amines such as diethanol amine, triethanol amine and the like; hydroxides of alkali metal element such as lithium hydroxide, sodium hydroxide, potassium hydroxide and the like; ammonium hydroxide, hydroxides of quaternary ammonium, hydroxides of quaternary phosphonium, lithium carbonate, sodium carbonate, potassium carbonate and other carbonates of alkali metals. An appropriate amount of 2-amino-2-etyol-1,3-propanediol enhances the dispersion stability of pigments more effectively and hence assures the reliability such as discharge stability.

The content thereof depends on the recipe and the desired pH value. In general, 0.01 mass % to 2.0 mass % is preferable, and 0.1 mass % to 1.0 mass % is more preferable. Also, an addition of 2-amino-2-ethyl-1,3-propanediol has been confirmed to enhance the reliability of wetting the material used for ink channel.

Examples of the antiseptic-antifungal agents are sodium dehydroacetate, sodium sorbate, sodium 2-pyridinethiol-1-oxide, sodium benzoate and sodium pentachlorophenol.

Examples of the chelating agents are sodium ethylenediaminetetraacetate, sodium nitrilotriacetate, sodium hydroxyethyl ethylenediaminetriacetate, and sodium diethylenetriaminepentaacetate and sodium uramil diacetate.

Examples of the rust-inhibitors are acidic sulfites, sodium thiosulfate, ammonium thiodiglycolate, diisopropylammonium nitrite, pentaerythritol tetranitrate, dicyclohexylammonium nitrite and benzotriazole.

An ink used in the present invention is characterized by the viscosity adjusted to 6 mPa·s to 13 mPa·s at 25° C. by the selection and the compounding ratio of components. Herewith, high image quality is assured even at high-speed printing on regular paper.

The ink is more effective when it is used in a recording method where the size of drops of discharged recording ink is preferably 3 pL to 40 pL, the velocity of the ejected drops is preferably 6 m/sec to 20 m/sec, the driving frequency is preferably 1 kHz or more, and the resolution is preferably 300 dpi or more, as well as when it is used in a recording method that provides a feature to discharge multiple ink drops continuously and merge them into a larger drop before the ink drops reach the recording medium.

According to the present invention, a desired ink with a colorant such as a pigment with the aforementioned average particle size may be obtained by, for example, adoption of an extra dispersion process of a colorant such as a pigment, selection of a dispersion medium, adjustment of the mixing ratio of the colorant with the selected dispersant, and/or adjustment of the stirring time and condition such as stirring speed, followed by adjustment of the condition of centrifugal separation.

Regarding the adjustment of the viscosity of the ink of the present invention within the aforementioned range, it is required to produce a high-density image with micro droplets in order to form a high-resolution image at high speed. Therefore, it is mandatory to increase the pigment concentration, which leads to the necessity to add an appropriate amount of a wetting agent that suits the pigment concentration in order to assure the discharge stability. As stated above, viscosity is adjustable by means of adjusting the type and quantity of wetting agent. Improved image quality is a benefit of the high viscosity. On the other hand, disadvantages are that higher discharge pressure is required and that it is difficult to assure the reliability. In fact, an ink that employs a colorant as small in diameter and is as highly viscous as that of the present invention is unprecedented.

<Inkjet Recording Apparatus and Inkjet Recording Method>

The inkjet recording apparatus according to the present invention comprises at least a unit for discharging ink drops (head), and piezoelectric or thermoelectric transducing method is employed as discharging method.

The head is characterized by a filter installed between an ink discharge unit and an ink supply unit, and fluid resistance of the filter to the employed ink is adjusted within the range of $4.4 \times 10^9$ Pa·s/m$^3$ and $2.2 \times 10^{10}$ Pa·s/m$^3$ in order to secure the discharge stability.

Furthermore, the head is comprised of a filter installed between an ink discharge unit that consists of multiple pressurized liquid chambers, nozzles with pore diameter of 35 μm or less, ink channel and piezoelectric or thermoelectric transducer for ink discharge, and an ink supply unit with ink tank that causes a negative pressure in the ink discharge unit.

Preferably, the inlet diameter of the inkjet nozzles is 30 μm or less, more preferably 25 μm or less.

Figure 2:
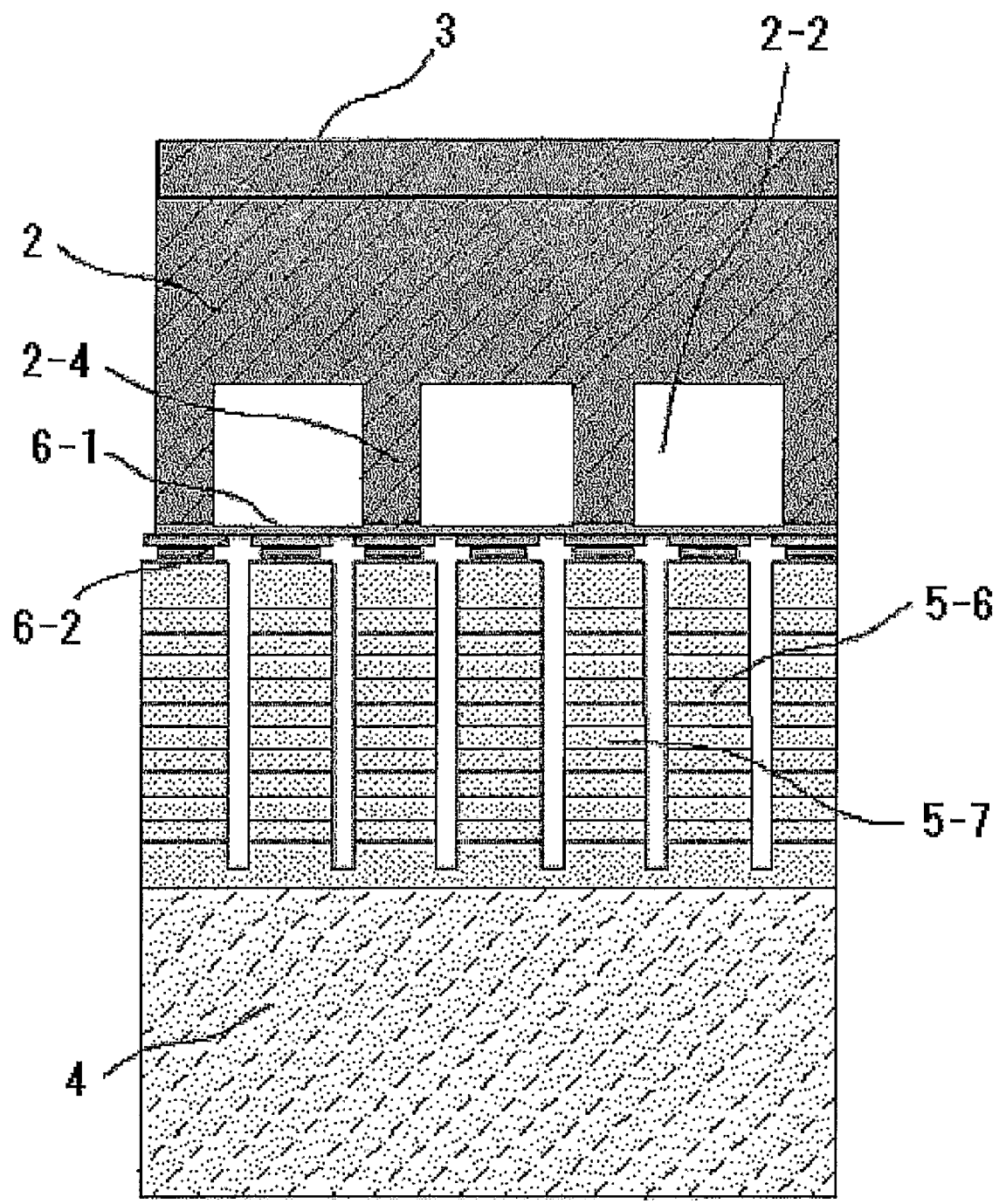
FIG. 2 is a cross-sectional view of an exemplary inkjet head, partially enlarged in the direction of channels, related to the present invention.

FIGS. 1 and 2 show an exemplary configuration of ink discharge unit that employs a piezoelectric transducer.

FIG. 1 shows a partially enlarged view of an inkjet head according to the present invention, and FIG. 2 is a cross-sectional view of the inkjet head partially enlarged in the direction of channels.

The inkjet head is comprised of the following: a frame 1, which is engraved to form an ink inlet (not shown) and a common liquid chamber 1-2; a channel plate 2, which is engraved to form a fluid resistive part 2-1, pressurized liquid chambers 2-2, and a communication slot 2-3 to communicate with a nozzle 3-1; a nozzle plate which forms the nozzle 3-1; a vibrating plate 6, which comprise a salient 6-1, a diaphragm part 6-2, and an ink inlet 6-3; laminated piezoelectric elements 5 bonded to the vibrating plate through an adhesive layer 7; and a base 4 which secures the laminated piezoelectric elements 5. The base 4 is made of barium titanate ceramic, where two rows of laminated piezoelectric elements 5 are arranged and bonded.

The piezoelectric elements 5 are formed by alternatively laminating piezoelectric layers (not shown) with 10 μm to 50 μm of thickness per layer made of lead zirconate tiatanate (PZT) and internal electrode layers (not shown) with several μm in thickness per layer made of silver/palladium (AgPd). The internal electrodes (not shown) are connected to outer electrodes (not shown) at their both ends.

The piezoelectric elements 5 are divided into comb-like shapes through half-cut dicing process; each shape is alternatively used as a driving part 5-6 and a supporting part 5-7.

The outside of the outer electrode (not shown) is limited in its length by notching, for example, in their lengths so that they are divided through a half-cut dicing process, and these render multiple independent electrodes. The other side maintains electric continuity without being divided through the dicing process and renders a common electrode 5-5.

An FPC 8 is solder-mounted to the independent electrodes (not shown) of the driving part. Further, the common electrode 5-5 is connected around an electrode layer provided at the end of the laminated piezoelectric element to Gnd electrode of the FPC 8. A driver IC (not shown) is mounted to the FPC 8; thereby, the driving voltage applied to the driving part 5-6 is controlled.

The vibrating plate 6, formed by coating the following with two layers of Ni-plate through an electroforming process: the thin-film diaphragm part 6-2, the island-shaped salient part 6-1 (island part), which is bonded to the laminated piezoelectric element 5 intended to be the driving part 5-6 on the central part of the diaphragm part 6-2; a thick-film part containing a beam connected to a support part (not shown); and a communication slot for the ink inlet 6-3. As for the diaphragm part, the thickness is 3 μm, and the width is 35 μm (one side).

The bonding between the island-like salient part 6-1 of the vibrating plate 6 and the driving part 5-6 of the piezoelectric elements 5 is achieved through patterning of the adhesive layer 7 containing gap materials.

The channel plate 2 is made of a silicon single crystal. On the silicon single crystal, the fluid resistive part 2-1, an impression to form the pressured liquid chambers 2-2 and pass-through slots, which is to form the communicating slot 2-3 with the nozzles 3-1, are patterned through an etching process.

The remaining part after etching forms a partition 2-4 between the pressured liquid chambers 2-2. Also, the fluid resistive part 2-1 is provided in the head by partially narrowing the etched width.

The nozzle plate 3, made of a metal material such as Ni-plate film formed through an electroforming process, possesses a number of nozzles 3-1 which act as fine outlets of discharge ink drops. The inside structure or interior structure of these nozzles is horn-shaped, wherein column-like or cone-like shape is also allowed. The size of a nozzle 3-1, which is the diameter at the ink drop outlet, is about 20 μm to 35 μm. The nozzle pitch of the each line is 150 dpi.

On the surface of the ink discharging side of the nozzle plate 3, a water-repellent layer (not shown) is provided through a water-repellant surface treatment (not shown). Examples of surface treatment method are PTFE-Ni eutectoid plating, electrodeposition coating of fluoride resin, vapor deposition coating of evaporative fluoride resin such as fluorinated pitch and coating followed by baking of solvent such as silicone resin and fluoride resin. Such a surface treatment method is selected depending on the ink properties so as to stabilize the shape of ink drop and discharging property, thereby to achieve high image quality.

The frame 1 is produced through resin molding where grooves are formed for the ink inlet (not shown) and the common liquid chamber 1-2.

In the inkjet nozzles of above construction, an application of driving waveform (pulse voltage of 10 V to 50 V) to the driving part 5-6 in accordance with a recording signal generates displacements in the direction of the laminated layer, pressurizing the liquid chamber 2-2 through the vibrating plate 3. The pressure in the pressurized liquid chambers 2-2 increases, and ink drops are discharged from the nozzles 3-1.

As the discharging of ink drops completes, the ink pressure in the pressurized liquid chambers 2-2 decreases, and a negative pressure develops in pressurized liquid chambers 2-2 through the inertia of ink flow and electric discharge process of driving pulse, transferring to ink-filling stroke. That is, the ink fed from the ink tank flows into the common liquid chamber 1-2, then flows from common liquid room 1-2 to fluid resistive part 2-1 through ink flow inlet 6-3 and fills up the pressurized liquid chambers 2-2.

The fluid resistive part 2-1 provides an effect of attenuating the residual pressure vibration after discharging, whereas it disturbs refilling by surface tension. Accordingly, the attenuation of the residual pressure and the period for refilling may be well balanced, and the cycle between the ink-discharging actions (drive period) may be shortened by properly selecting the fluid resistive part.

In the present invention, at least one part that comprises the liquid discharge unit of the inkjet head, namely the liquid chambers, the fluid resistive part, the vibrating plate, and the nozzles, is preferable to be made of a material that comprises either silicon or nickel.

Figure 3:
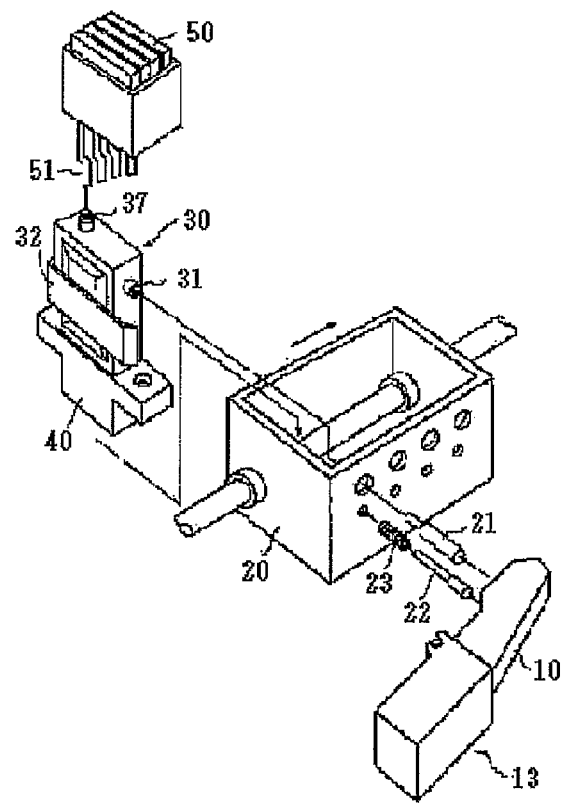
FIG. 3 is an exploded perspective diagram of an exemplary constitution surrounding an inkjet head.
Figure 4:
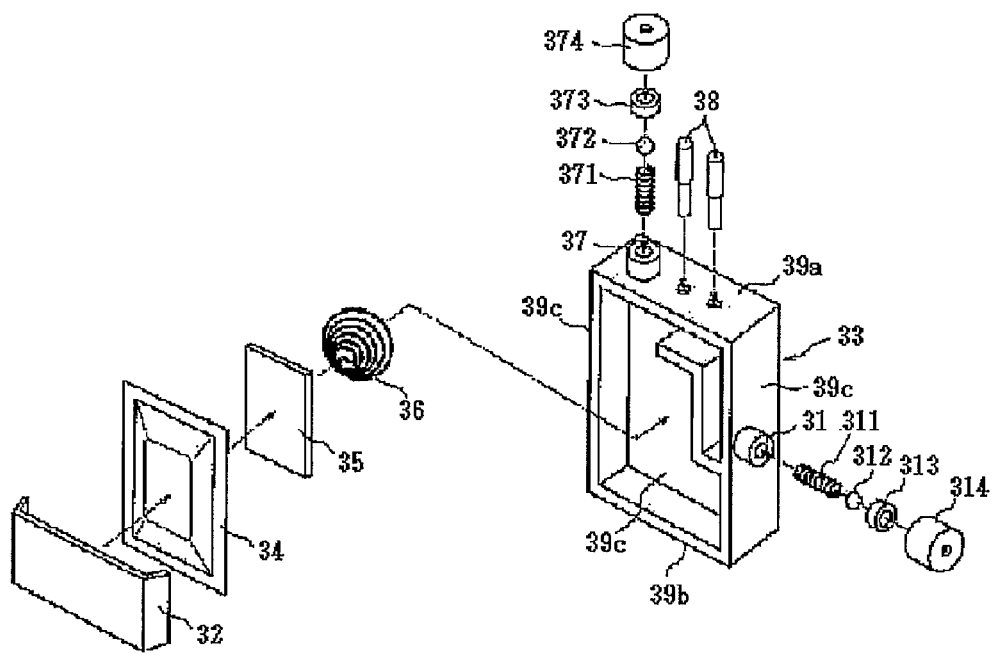
FIG. 4 is an exploded perspective diagram of an exemplary configuration of a cartridge.

FIGS. 3 and 4 show an example of ink supply unit (hereinafter referred to as sub-tank).

FIG. 3 is a perspective exploded block diagram to describe an exemplary constitution surrounding the inkjet head. FIG. 3 comprises a lever 10; a driving unit 13 for the lever 10; a carriage 20 that carries the inkjet head; a vent pin 21; a negative-pressure pin 22; an elastic member 23; a sub-tank 30 that stocks ink within the carriage; an atmospheric vent 31 to adjust the internal pressure of the sub-tank to ambient pressure; a negative-pressure lever 32; the inkjet head 40 (hereinafter referred to as head); the ink cartridge 50; a joint tube 51 to connect the ink cartridge 50 and the sub-tank 30 for supplying ink to the sub-tank 30.

The filter of the present invention is installed where the sub-tank 30 and the head 40 are jointed in FIG. 3. For printers with large-capacity ink cartridge or printers intended for high image quality, image displacement may occur due to the weight of the carriage 20 in motion. Therefore, as shown in FIG. 3, such printers are configured wherein the ink cartridge 50 is placed outside of the carriage 20, and the carriage 20 employs the sub-tank 30 as a temporary ink reservoir.

When the internal pressure of the sub-tank 30 is positive, ink may leak from the head 40 due to its own weight. Therefore, it is necessary to set the inside pressure of the tank to negative. A pressure configuration such as above is important for the feature that a jet of ink is produced from the head. However, a degradation of image formed by ink occurs when the amount of air within the sub-tank 30 increases with time with the possibility of air entering from the ink cartridge 50 and the joint tube 51. Hence, the air proportion and pressure configuration inside the ink cartridge 50 are controlled back to their original states on a regular basis.

FIG. 4 is an exploded perspective diagram of an exemplary configuration of a cartridge for describing the sub-tank 30 shown in FIG. 3 in more detail.

The sub-tank 30 is comprised of the following: a case 33 with one side wall open and the rest surrounded by an upper wall 39*a*, a bottom wall 39*b* and three side walls 39*c*, each of which is nearly rectangle; a film 34 that covers the opening; elastic member that presses the film 34 from the inside via a plate 35; and a negative-pressure lever 32, which is a tabular elastic member that presses back the film 34 from the outside. An elastic member 36, which presses the film 34 from the inside, is configured such that it presses the film 34 with a higher pressure than the negative-pressure lever 32 that presses film 34 from the outside; therefore, the film 34 is being pressed towards the outside at an initial state. At this time, the equilibrium in the suppress strength between the negative-pressure lever 32 and the internal elastic member 36 changes according to the fluctuation in the internal pressure of the sub-tank 30. When ink in the sub-tank 30 decreases in quantity, the film 34 is pressed back inside due to the change in the internal pressure.

Under normal conditions, the atmospheric vent 31, provided on one of the side walls 39c, and an ink-filling opening 37 are sealed tightly by balls 312 and 372 that are pressed by elastic members 311 and 371 of springs and such, elastic members 313 and 373 of rubber and such and caps 314 and 374, respectively. An ink-filling opening 37 is released by the pressure of ink flown through the joint tube 51, and the flowing ink is introduced to the inside of the sub-tank 30. Also, the atmospheric vent 31 is released by the vent pin 21, provided on the carriage 20 in FIG. 3, being pressed, and hence the internal pressure of the sub-tank 30 can be adjusted.

In addition, the negative-pressure pin 22 that pushes in the negative-pressure lever 32 from the outside is provided on the carriage 20. By pushing in the negative-pressure pin 22 such that the negative-pressure lever 32 is displaced towards the inside of the sub-tank 30, the internal volume of the sub-tank 30 becomes smaller. The elastic member 23 is configured such that the negative-pressure lever 32 and the negative-pressure pin 22 are biased against each other in the opposite direction; due to the action of the elastic member 23, the negative-pressure lever 32 and the negative-pressure pin 22 are not usually in contact with each other.

The operation of the inkjet head configured as described above is as follows. First, ink is filled through the ink-filling opening 37 in a condition where the internal volume of the sub-tank is being reduced by operating the vent pin 21 to relieve the atmospheric vent 31 as well as by operating the negative-pressure pin 22 to push in the negative-pressure lever 32. The ink filled is detected by a liquid fill-up detection sensor 38, located at the top of the sub-tank 30. The ink supply is controlled by the detection results; therefore, the quantities of air and ink in the sub-tank 30 are determined. Then, keeping the sub-tank 30 sealed by closing the atmospheric vent 31, relieve the pressure against the negative-pressure 32, which has been kept pressed. By this operation the inside of the sub-tank 30 is controlled at a constant negative-pressure, a stable inkjet property at the head 40 may be achieved.

An aspect of the inkjet recording apparatus of the present invention is explained hereinafter with reference to FIGs.

Figure 5:
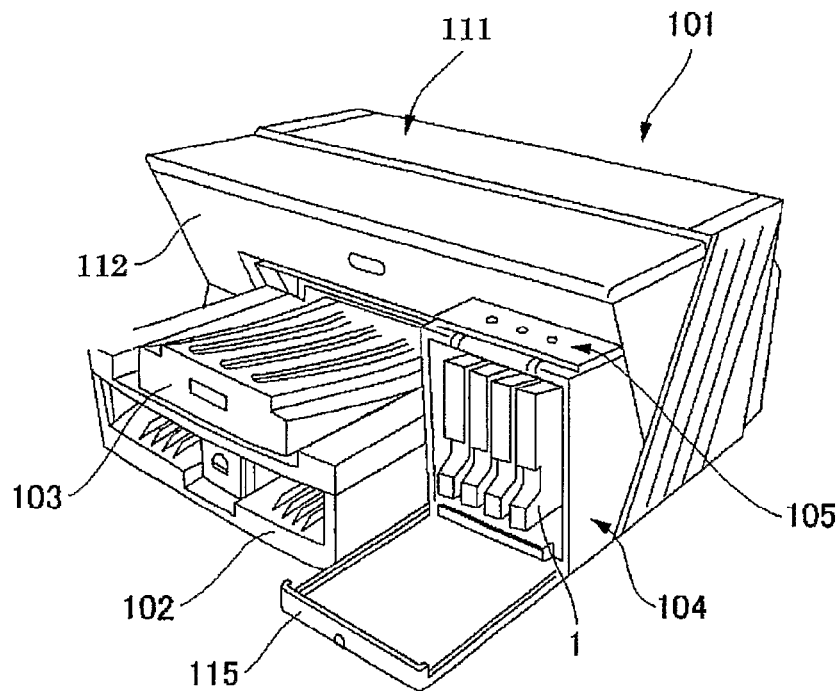
FIG. 5 schematically shows an exemplary inkjet recording apparatus according to the present invention.

The inkjet recording apparatus shown in FIG. 5 comprises a main body 101, a paper feeding tray 102 mounted on the main body 101 for charging paper, a paper discharging tray 103 mounted on the main body 101 for stocking the image-recorded (formed) paper, an ink cartridge mounting portion 104, an upper cover 111, and a front face 112.

On the upper side of the ink cartridge mounting portion 104, an operating portion 105 equipped with operating keys, a display and such is arranged. The ink cartridge mounting portion 104 comprises an openable and closable front cover 115 in order to mount and remove the ink cartridge 1.

Figure 6:
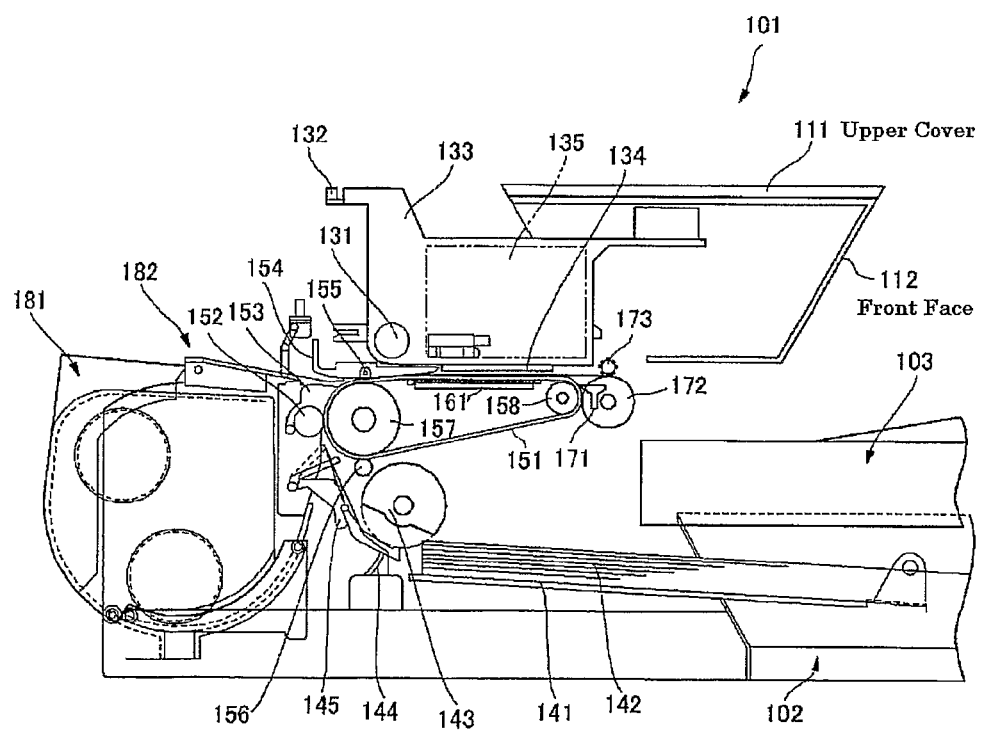
FIG. 6 schematically shows an exemplary internal constitution of an inkjet recording apparatus of FIG. 5.
Figure 7:
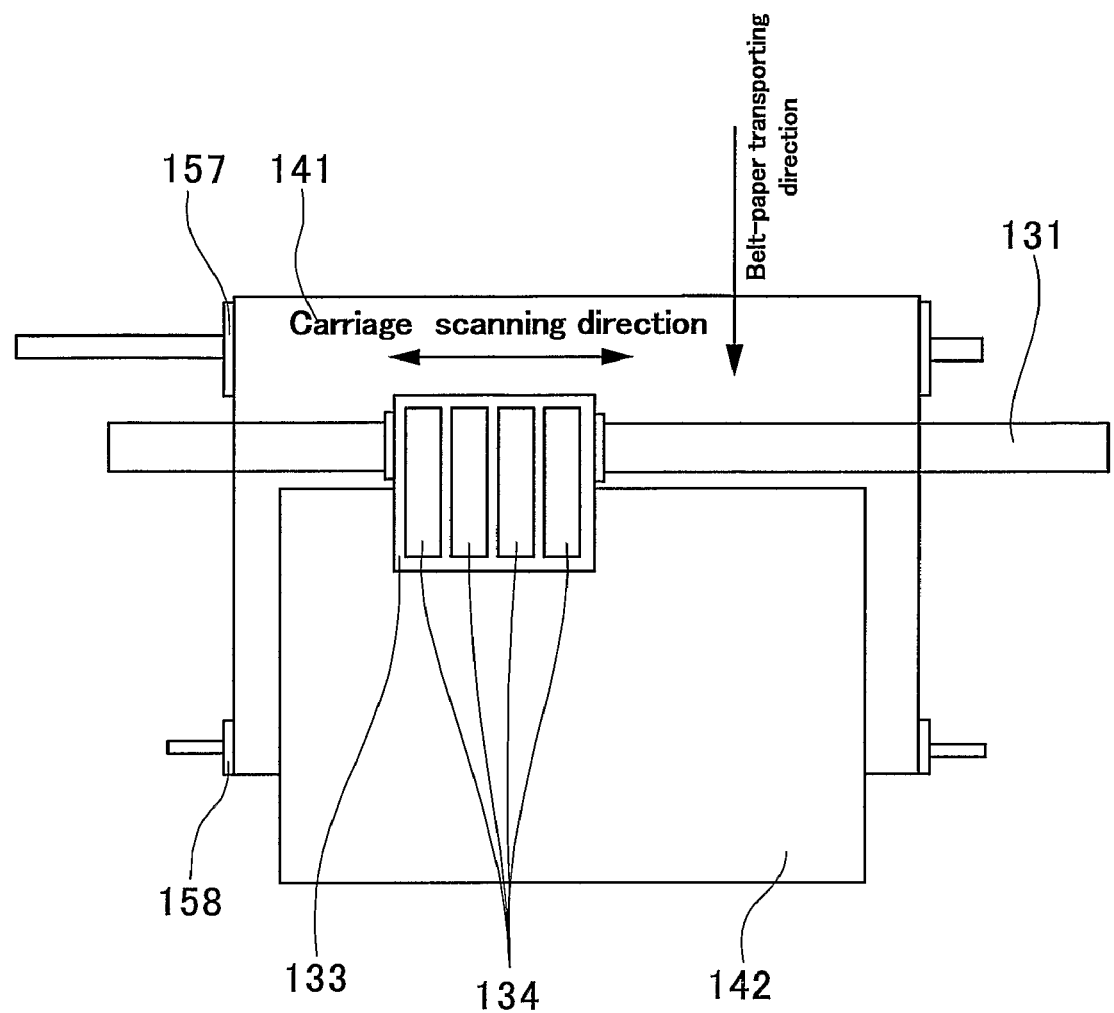
FIG. 7 is a plan view showing an exemplary inkjet head of an inkjet recording apparatus of FIG. 5.

In the main body 101, as shown in FIGS. 6 and 7, a carriage 133 is supported by guide members, namely a guide rod 131 and a stay 132, that bridge laterally the right and left side plates (not shown) so that the carriage 133 may slide freely in the main scanning direction and scan with a main scanning motor (not shown) in the direction indicated by the arrow in FIG. 7.

The carriage 133 comprises a recording head 134, equipped with four inkjet recording heads that discharge the respective recording ink drops of yellow (Y), cyan (C), magenta (M) and black (Bk), wherein the recording head 134 is mounted such that the respective ink outlets intersect with the direction of main scanning and that the discharged inks travel downward.

The inkjet recording heads of the recording head 134 may employ an energy generating unit for discharging the ink, for example, a piezoelectric actuator such as a piezoelectric element, a thermal actuator that utilizes the phase change due to film boiling of liquid by means of electrothermal elements such as heating resistors, a shape-memory alloy actuator that utilizes metallic phase change due to temperature change and electrostatic actuator that utilizes electrostatic power.

Further, color-identified sub-tanks 135 are mounted on the carriage 133 to supply color-identified inks to the recording head 134. The ink is fed to and refills the sub-tanks 135 from the cartridge 1, mounted on the ink cartridge mounting portion 104, through a recording-ink-supplying tube (not shown).

At the same time, a paper-feeding section for feeding accumulated paper 142 on a paper-loading unit (pressure plate) 141 of a paper-feeding tray 102 comprises a half-moon collar (a paper-feeding collar 143) and a separating pad 144, in which the half-moon collar feeds paper 142 sheet-by-sheet from the paper-loading unit 141. The separating pad 144 is disposed oppositely to the paper-feeding collar 143 and is made of a material with relatively high friction coefficient, and the separating pad 144 is pressed toward the paper-feeding collar 143.

The transporting section, which transports paper 142 from the paper-feeding section in the space below the recording head 134, comprises a transport belt 151 that electrostatically attracts paper 142 and transports it; a counter roller 152 that transports paper 142 from the paper-feeding section through a guide 145 by pinching with the transport belt 151; a transport guide 153 that forces the direction of paper 142, being transported approximately in a vertical direction, to change by about 90 degrees to follow the transport belt 151; a pressure collar 155 that is pressed toward the transport belt 151 by a pressing member 154; and also an electrified roller 156, as a means of static electrification, that electrostatically charges the surface of the transport belt 151.

The transport belt 151 is an endless belt that is spanned over a transport roller 157 and a tension roller 158 and is able to rotate in the transporting direction of the belt. At the back side of the transport belt 151, a guide member 161 is arranged such that it corresponds to the printing region of the recording head 134. Further, the paper-discharging section that discharges paper 142 recorded by the recording head 134 comprises a separating pawl 171 for separating paper 142 from the transport belt 151, a delivery roller 172 and a delivery collar 173. A delivery tray 103 is located below the delivery roller 172.

At the back side of the main body 101, a double-sided paper-feeding unit 181 is mounted in a manner that allows attachment and removal. The double-sided paper feeding unit 181 entraps paper 142 returned by reverse rotation of the transport belt 151, turns it over, and then feeds it again between counter roller 152 and transporting belt 151. Also, a manual paper-feeding unit 182 is provided above the double-sided paper-feeding unit 181.

In the inkjet recording apparatus, paper 142 is fed sheet-by-sheet from the paper-feeding section, and paper 142 fed in approximately a vertical direction is directed by the guide 145 and transported while being pinched between the transport belt 151 and the counter roller 152. Then, paper 142 is guided at its leading end by transporting guide 153. Pressed on the transport belt 151 by the pressure roller 155, the transporting direction is turned about 90 degrees.

At this stage, the transport belt 151 is electrostatically charged by the electrified roller 156; thereby paper 142 is transported in a condition being electrostatically attached to the transport belt 151. Here, by driving the recording head 134 in accordance with the image signals along with the moving carriage 133, one-line image is recorded with ink drops discharged onto the stationary paper 142, then the paper 142 is moved by a pre-determined distance, and the next line is recorded. When an end-of-record signal or a signal that the tailing end of the paper 142 has reached the recording region is received, the recording operation is terminated, and the paper 142 is removed into a delivery tray 103.

Further, when the ink remained in the sub-tank 135 is detected to be nearly depleted, a required amount of recording ink is supplied to the sub-tank 135 from the ink cartridge 1.

In the inkjet recording apparatus, when the ink in the ink cartridge 1 is consumed completely, only an ink bag 2 in the ink cartridge 1 is replaced by disassembling the housing 3 of the ink cartridge 1. Alternatively, the ink cartridge 1 may be of longitudinal disposition with front-side mounting configuration; this also allows a stable feed of recording ink. Therefore, even in the cases where the apparatus of the present invention is placed with the upper space of the main body 101 being obscured, for example when the apparatus of the present invention is placed in a rack and when some object is disposed on the main body 101, the ink cartridge 1 may be replaced easily.

Meanwhile, although the examples hereinbefore of the present invention are those applied to a Serial type (Shuttle type) inkjet recording apparatus with a scanning carriage, the present invention is similarly applicable to a Line type inkjet recording apparatus equipped with a line-type head.

In addition, the inkjet recording apparatus and inkjet recording method according to the present invention may be applied to various recordings based on inkjet recording method such as printers, facsimiles, copiers, complex apparatus of printer/facsimile/copier, for inkjet recording.

According to the present invention, in an inkjet recording apparatus which discharges an ink that comprises a water-dispersible colorant, a humectant, a surfactant and a wetting agent from a head in which a filter is installed, wherein the viscosity of the ink is adjusted to 6 mPa·s to 13 mPa·s at 25° C., the average particle diameter of the colorant is in the range of 5 nm to 200 nm, and the fluid resistance of the filter to the ink is in the range of $4.4 \times 10^9$ Pa·s/m$^3$ to $2.2 \times 10^{10}$ Pa·s/m$^3$ at the temperature of 25° C. and the head pressure of 150 mm aq., it has a beneficial effect that an inkjet apparatus recording with both high reliability and high image quality may be provided.

The present invention will be illustrated in more detail with reference to examples given below, but these are not to be construed as limiting the present invention. All percentages and parts are by mass unless otherwise indicated.

Production Example 1

| - Preparation of Black Ink - | |
|---|---|
| KM-9036 (Toyo Ink Mfg. Co., Ltd., self-dispersible carbon black) | 50% |
| Glycerin | 10% |
| 1,3-butanediol | 15% |
| 2-ethyl-1,3-hexanediol | 2% |
| 2-pyrrolidone | 2% |
| Surfactant (1-9) $C_{13}H_{27}O(C_2H_4O)_9H$ | 1% |
| Silicone Antifoamer KS508 (Shin-Etsu Chemical Co., Ltd.) | 0.1% |
| De-ionized water | balance |

The ink ingredients of the above-noted recipe were mixed sufficiently at room temperature to produce an ink composition. Then, the resulting ink composition was filtered through a membrane filter having an average pore size of 1.2 μm; thereby an ink of Production Example 1 was prepared. The viscosity of the ink at 25° C. was 7.6 mPa·s, and the average particle diameter of the colorant in the ink was 102 nm.

Production Example 2

Preparation of Polymer Solution A

After a one-liter flask equipped with a stirrer, thermometer, inlet tube for nitrogen gas, reflux condenser, and dropping funnel was sufficiently purged with nitrogen gas, 11.2 g of styrene, 2.8 g of acrylic acid, 12.0 g of lauryl methacrylate, 4.0 g of polyethyleneglycol methacrylate, 4.0 g of styrene macromer, and 0.4 g of mercapto ethanol were blended and heated to 65° C.

Then, a mixed solution consisting of 100.8 g of styrene, 25.2 g of acrylic acid, 108.0 g of lauryl methacrylate, 36.0 g of polyethyleneglycol methacrylate, 60.0 g of hydroxyethyl-methacrylate, 36.0 g of styrene macromer, 3.6 g of mercapto ethanol, 2.4 g of azobismethyl valeronitrile, and 18 g of methylethylketone was fed by drops into the flask for 2.5 hours. After the dropping of the solution was completed, a mixed solution consisting of 0.8 g of azobismethyl valeronitrile and 18 g of methylethylketone was fed by drops into the flask for 0.5 hours.

The solution was aged at 65° C. for one hour. Then, 0.8 g of azobismethyl valeronitrile was added to the flask, and the solution was aged for another one hour. After the reactions were completed, 364 g of methylethylketone was added to the flask, and 800 g of polymer solution A with a concentration of 50% was recovered.

—Preparation of Aqueous Dispersion of Pigment-Containing Polymer Fine Particles—

A mixture of 28.0 g of polymer solution A, 26.0 g of C.I. pigment yellow 97, 13.6 g of potassium hydroxide aqueous solution of 1 mol/L, 20 g of methylethylketone, and 13.6 g of de-ionized water was sufficiently stirred and then kneaded with a roll mill. The resulting paste was introduced to 200 g of de-ionized water, which was then given a sufficient stirring. This was distilled in an evaporator to remove methylethylketone and water, and finally an aqueous dispersion of yellow polymer particles with an average particle diameter of 80 nm was prepared.

The particle diameter was determined by means of Particle Size Analyzer UPA 150 manufactured by Microtrac Inc., where the solution was diluted by the pigment concentration of 0.01%.

| - Yellow Ink - | |
| --- | --- |
| Dispersion of Yellow Polymer Fine Particles | 40% |
| Glycerin | 8% |
| 1,3-butanediol | 20% |
| 2,2,4-tri methyl-1,3-pentanediol | 2% |
| Surfactant (1-8) $C_{13}H_{27}O(C_2H_4O)_7H$ | 1.5% |
| Silicone Antifoamer KS508 (Shin-Etsu Chemical Co., Ltd.) | 0.1% |
| De-ionized water | balance |

The ink ingredients of the above-noted recipe were mixed sufficiently at room temperature to produce an ink composition. Then, the resulting ink composition was filtered through a membrane filter having an average pore size of 1.2 μm; thereby an ink of Production Example 2 was prepared. The viscosity of the ink at 25° C. was 7.8 mPa·s.

Production Example 3

Preparation of Aqueous Dispersion of Pigment-Containing Polymer Fine Particles

An aqueous dispersion of magenta polymer fine particles having an average particle diameter of 140 nm was prepared in the same manner as Production Example 2, except that the pigment in Production Example 2 was replaced by C.I. pigment red 122.

| - Magenta Ink - | |
| --- | --- |
| Dispersion of magenta polymer fine particles | 50% |
| Glycerin | 10% |
| 1,3-butanediol | 18% |
| 2,2,4-tri methyl-1,3-pentanediol | 2% |
| Surfactant (1-8) $C_{13}H_{27}O(C_2H_4O)_7H$ | 1.5% |
| Silicone Antifoamer KS508 (Shin-Etsu Chemical Co., Ltd.) | 0.1% |
| De-ionized water | balance |

The ink ingredients of the above-noted recipe were mixed sufficiently at room temperature to produce an ink composition. Then, the resulting ink composition was filtered through a membrane filter having an average pore diameter of 1.2 μm; thereby an ink of Production Example 3 was prepared. The viscosity of the ink at 25° C. was 8.1 mPa·s.

Production Example 4

Preparation of Aqueous Dispersion of Pigment-Containing Polymer Fine Particles

An aqueous dispersion of cyan polymer fine particles having an average particle diameter of 110 nm was prepared in the same manner as Production Example 2, except that the pigment in Production Example 2 was replaced by C.I. pigment blue 15:3.

| - Cyan Ink - | |
| --- | --- |
| Dispersion of cyan polymer fine particles | 40% |
| Glycerin | 8% |
| 1,3-butanediol | 20% |
| 2,2,4-tri methyl-1,3-pentanediol | 2% |
| Surfactant (1-8) $C_{13}H_{27}O(C_2H_4O)_7H$ | 1.5% |
| Silicone Antifoamer KS508 (Shin-Etsu Chemical Co., Ltd.) | 0.1% |
| De-ionized water | balance |

The ink ingredients of the above-noted recipe were mixed sufficiently at room temperature to produce an ink composition. Then, the resulting ink composition was filtered through a membrane filter having an average pore size of 1.2 μm; thereby an ink of Production Example 4 was prepared. The viscosity of the ink at 25° C. was 7.9 mPa·s.

<Filter>

As a filter material, stainless steel is preferable. SUS 304 is commonly used; SUS 316 with improved corrosion resistance may also be used. An example of manufacturing a filter from these materials is a process that produces a mesh filter through web manufacturing of stainless steel fiber followed by vacuum sinistering and rolling. The permeability of these filters may be managed by a property bubble point pressure.

Four types of filters were used for evaluation. With inks of Production Examples 1 to 4, the fluid resistance of these filters against each ink at 25° C. was measured at a temperature of 25° C. and head pressure of 150 mm aq.

When a volume of ink (V) was flown for a time period (T), the fluid resistance R of a filter under pressure P can be obtained by R=PT/V.

Specifically, the fluid resistance was calculated by measuring the efflux time per mass (g) of ink when the ink was flown from the height with a head of 150 mm. Table 1 shows the bubble point pressure and the fluid resistance of each filter.

TABLE 1

| | | Fluid Resistance ($\times 10^{10}$ Pa · s/m³) | | | |
| --- | --- | --- | --- | --- | --- |
| | Bubble-point pressure | Production Example 1 | Production Example 2 | Production Example 3 | Production Example 4 |
| Filter A | 7000 Pa | 2.80 | 3.00 | 3.80 | 3.20 |
| Filter B | 5000 Pa | 1.10 | 1.10 | 1.20 | 1.50 |
| Filter C | 3400 Pa | 0.46 | 0.48 | 0.54 | 0.55 |
| Filter D | 2000 Pa | 0.11 | 0.09 | 0.20 | 0.16 |

Examples 1 to 2 and Comparative Examples 1 to 2

Next, the following printers were filled with the inks of the above Production Examples 1 to 4: Printer A, IPSiO G707, manufactured by Ricoh Co., Ltd., with a head that comprises Filter A; Printer B, IPSiO G707, manufactured by Ricoh Co., Ltd., with a head that comprises Filter B; Printer C, IPSiO G707, manufactured by Ricoh Co., Ltd., with a head that comprises Filter C; and Printer D, IPSiO G707, manufactured by Ricoh Co., Ltd., with a head that comprises Filter D. Then, Evaluation (1) was conducted as below.

Evaluation (1)—Performance Evaluation of Continuous Printing—

Performance of continuous printing was evaluated at a temperature of 23° C. and a relative humidity (hereinafter referred to as RH) of 45%. Regarding the print pattern, a black-and-white letter pattern was printed on 1,000 pages, followed by images including color graphic pattern on 400 pages. No nozzle recovery operation such as cleaning was conducted during the evaluation. Before and after the evaluation, nozzle check patterns were printed to find the number of occurrences of nozzle down; the number was evaluated based on the following ratings. The results are shown in Table 2.

TABLE 2

|  |  | Occurrences of Nozzle Down | | | |
|---|---|---|---|---|---|
|  |  | Production Example 1 | Production Example 2 | Production Example 3 | Production Example 4 |
| Comparative Example 1 | Printer A | D | D | D | D |
| Example 1 | Printer B | B | B | B | A |
| Example 2 | Printer C | A | B | B | A |
| Comparative Example 2 | Printer D | D | C | C | D |

The results shown in Table 2 indicate that larger fluid resistance causes inadequate ink supply and increases the number of occurrences of nozzle down. On the other hand, too small fluid resistance allows the comingling of foreign substances and causes a nozzle down.

Evaluation (2)—Performance Evaluation of Continuous Printing—

Performance of continuous printing was evaluated at 10° C. and 15% RH. Regarding the print pattern, a black-and-white letter pattern was printed on 1,000 pages, followed by images including color graphic pattern on 400 pages. A cleaning was sequenced at every 150 pages during the evaluation. Before and after the evaluation, nozzle check patterns were printed to find the number of occurrences of nozzle down; the number was evaluated based on the following ratings. The results are shown in Table 3.

TABLE 3

|  |  | Occurrences of Nozzle Down | | | |
|---|---|---|---|---|---|
|  |  | Production Example 1 | Production Example 2 | Production Example 3 | Production Example 4 |
| Comparative Example 1 | Printer A | D | D | D | D |
| Example 1 | Printer B | B | B | B | B |
| Example 2 | Printer C | B | B | B | B |
| Comparative Example 2 | Printer D | C | C | C | C |

The results shown in Table 3 indicate that a cool-temperature condition increases the viscosity of inks, resulting in higher fluid resistance. Therefore, even with an addition of cleaning sequence, the results of Printer A deteriorated compared to Evaluation (1).

Production Example 5

Preparation of Ink

The ink of Production Example 5 was prepared in the same manner as Production Example 3, except that a refined ink pigment was used and that an aqueous dispersion of magenta polymer fine particles with an average particle diameter of 90 nm was used. The viscosity of the ink at 25° C. was 8.1 mPa·s. Also, the bubble point pressure and fluid resistance of filters were measured in the same manner as Production Example 1. The results are shown in Table 4.

TABLE 4

|  | Bubble point pressure | Fluid Resistance ($\times 10^{10}$ Pa·s/m$^3$) Production Example 5 |
|---|---|---|
| Filter A | 7000 Pa | 3.20 |
| Filter B | 5000 Pa | 0.98 |
| Filter C | 3400 Pa | 0.46 |
| Filter D | 2000 Pa | 0.13 |

Examples 3 to 4 and Comparative Examples 3 to 4

Evaluations (1) and (2) as described above were conducted with Filters A to D (i.e. Printers A to D), except that an ink of Production Example 5 was used. The results are shown in Table 5.

TABLE 5

|  |  | Occurrences of Nozzle Down | |
|---|---|---|---|
|  |  | Evaluation 1 | Evaluation 2 |
| Comparative Example 3 | Printer A | D | D |
| Example 3 | Printer B | A | B |
| Example 4 | Printer C | A | A |
| Comparative Example 4 | Printer D | D | D |

The results in Table 5 indicate that an inkjet recording apparatus with higher discharge stability may be produced by combining an ink with smaller pigment diameter.

Production Example 6

Preparation of Ink Set

The inks of Production Examples 1 to 4 were combined as an ink set of Production Example 6.

Comparative Production Example 1

Preparation of Ink Set

The ink set of Comparative Production Example 1 was prepared in the same manner as Production Example 6, except that the surfactant and wetting agent of Production Example 6 were not compounded.

The viscosities of the black ink, the yellow ink, the magenta ink and the cyan ink in the ink set of Comparative Production Example 1 were 6.3 mPa·s, 6.5 mPa·s, 6.8 mPa·s and 6.5 mPa·s, respectively.

Comparative Production Example 2

Preparation of Ink Set

The ink set of Comparative Production Example 2 was prepared in the same manner as Production Example 6, except that the wetting agent of Production Example 6 was not compounded.

The viscosities of the black ink, the yellow ink, the magenta ink and the cyan ink in the ink set of Comparative Production Example 2 were 6.6 mPa·s, 6.8 mPa·s, 7.0 mPa·s and 6.8 mPa·s, respectively.

Comparative Production Example 3

Preparation of Ink Set

The ink set of Comparative Production Example 3 was prepared in the same manner as Production Example 6, except that the surfactant of Production Example 6 was not compounded.

The viscosities of the black ink, the yellow ink, the magenta ink and the cyan ink in the ink set of Comparative Production Example 3 were 7.0 mPa·s, 7.3 mPa·s, 7.5 mPa·s and 7.4 mPa·s, respectively.

Example 5 and Comparative Examples 5 to 7

A performance evaluation was conducted with the ink sets obtained as described in Production Example 6 and Comparative Production Examples 1 to 3. The results are shown in Table 6.

Evaluation (4)—Evaluation of Print Quality—

A color image was printed with each ink set in a mode such that the level of the print speed is the same. Each printed image was visually evaluated for letter bleeding and color boundary bleeding. Regular paper was used for the evaluation.

The results of the evaluation were expressed with the following ratings:

TABLE 6

|  | Letter Bleeding | Color Boundary Bleeding |
|---|---|---|
| Example 5 | A | A |
| Comparative Example 5 | D | D |
| Comparative Example 6 | C | C |
| Comparative Example 7 | C | C |

The results in Table 6 show that ink sets that lack a surfactant and wetting agent give severe letter bleeding and color boundary bleeding. The results also indicate that high image quality may be easily achieved with ink set of Example 5.

Production Example 7

Preparation of Ink

The ink of Production Example 7 was prepared in the same manner as the ink of Production Example 4, except that the amount of glycerin was changed to 5 mass % and that the amount of 1,3-butanediol was changed to 23 mass %. The viscosity of the ink at 25° C. was 8.2 mPa·s

Production Example 8

Preparation of Ink

The ink of Production Example 8 was prepared in the same manner as the ink of Production Example 4, except that the amount of glycerin was changed to 23 mass %, and that the amount of 1,3-butanediol was changed to 5 mass %. The viscosity of the ink at 25° C. was 6.8 mPa·s

Examples 6 to 8

Evaluation (4) was conducted as described above with inks of Production Examples 4, 7 and 8. The results are shown in Table 7.

TABLE 7

|  | Ink | Letter Bleeding |
|---|---|---|
| Example 6 | Production Example 4 | A |
| Example 7 | Production Example 7 | A |
| Example 8 | Production Example 8 | B |

Production Example 9

Preparation of Ink

The ink of Production Example 9 was prepared in the same manner as the ink of Production Example 2, except that 0.5 mass % of 2-amino-2-ethyl-1,3-propanediol was included additionally to the ink composition. The viscosity of the ink at 25° C. was 8.2 mPa·s

Production Example 10

Preparation of Ink

The ink of Production Example 10 was prepared in the same manner as the ink of Production Example 4, except that 0.5 mass % of 2-amino-2-ethyl-1,3-propanediol was included additionally to the ink composition. The viscosity of the ink at 25° C. was 8.4 mPa·s.

Examples 9 and 10

Evaluation (4) concerning letter bleeding was conducted with inks of Production Examples 9 and 10. The results were equivalent to those with inks without additives (i.e. Production Examples 2 and 4).

Examples 11 to 16

Evaluation (5) was conducted with inks of Production Examples 2, 4, 7, 8, 9 and 10. The results are shown in Table 8.

Evaluation (5)—Intermittent Printing Examination—

An ink jet printer, IPSiO Jet 300, with nozzle size 31 μm, manufactured by Ricoh Co., Ltd., was employed as an evaluation instrument. The following is the operation sequence in this evaluation: first, free scanning, that is, the carriage was scanned without discharge for a period of time, was given for 30 seconds; then, 20 drops per nozzle were printed on glossy film for ink jet; and finally, a recovery action (i.e. 50 drops of purging) was taken. The sequence was repeated for 10 times.

A macrophotograph of the first dot among the 20 drop in the direction of the jet direction was taken and visually evaluated according to the ratings below:

TABLE 8

|  | Ink | Intermittent Printing Examination |
|---|---|---|
| Example 11 | Production Example 2 | B |
| Example 12 | Production Example 4 | B |
| Example 13 | Production Example 7 | C |
| Example 14 | Production Example 8 | B |
| Example 15 | Production Example 9 | A |
| Example 16 | Production Example 10 | A |

The results shown in Table 8 indicate that when the glycerin content is less than 20 mass %, the reliability is reduced. On the other hand, when the glycerin content is greater than 80 mass %, letter bleeding occurs. Further, an addition of 2-amino-2-ethyl-1,3-propanediol enhances the discharge reliability.

Production Example 11

- Preparation of Ink -

First, pigment dispersion was prepared with the following recipe.
- Yellow Pigment Dispersion -

| | |
|---|---|
| C. I. Pigment Yellow 97 | 30% |
| Polyoxyethyleneoleylether ammoniumsulfate | 15% |
| Ethylene glycol | 30% |
| Pure water | balance |

After the above-noted ingredients were mixed, dispersion was performed in a wetted sand mill, followed by centrifugation to remove coarse particles. As a result, yellow pigment dispersion was prepared.

- Yellow Ink -

| | |
|---|---|
| Yellow Pigment Dispersion | 20% |
| Glycerin | 8% |
| 3-methyl-1,3-butanediol | 25% |
| 2-ethyl-1,3-hexanediol | 2% |
| Surfactant (1-7) $C_{13}H_{27}O(C_2H_4O)_5H$ | 2% |
| Silicone Antifoamer KS531 (Shin-Etsu Chemical Co., Ltd.) | 0.1% |
| De-ionized water | balance |

The ink ingredients of the above-noted recipe were mixed sufficiently at room temperature to produce an ink composition. Then, the resulting ink composition was filtered through a membrane filter having an average pore diameter of 1.2 μm; thereby an ink of Production Example 11 was prepared. The viscosity of the ink at 25° C. was 6.6 mPa·s.

Production Example 12

- Preparation of Ink -

First, pigment dispersion was prepared with the following recipe.
- Magenta Pigment Dispersion -

| | |
|---|---|
| C.I. Pigment Red 122 | 30% |
| Polyoxyethyleneoleylether ammoniumsulfate | 15% |
| Glycerin | 30% |
| Pure water | balance |

After the above-noted ingredients were mixed, dispersion was performed through a triple roller mill, followed by centrifugation to remove coarse particles. As a result, magenta pigment dispersion was prepared.

- Magenta Ink -

| | |
|---|---|
| Magenta Pigment Dispersion | 25% |
| Glycerin | 7% |
| 3-methyl-1,3-butanediol | 23% |
| 2-ethyl-1,3-hexanediol | 2% |
| Surfactant (1-7) $C_{13}H_{27}O(C_2H_4O)_5H$ | 1% |
| Silicone Antifoamer KS531 (Shin-Etsu Chemical Co., Ltd.) | 0.1% |
| De-ionized water | balance |

The ink ingredients of the above-noted recipe were mixed sufficiently at room temperature to produce an ink composition. Then, the resulting ink composition was filtered through a membrane filter having an average pore diameter of 1.2 μm; thereby an ink of Production Example 12 was prepared. The viscosity of the ink at 25° C. was 6.8 mPa·s.

Production Example 13

- Preparation of Ink -

First, pigment dispersion was prepared with the following recipe.
- Cyan Pigment Dispersion -

| | |
|---|---|
| C.I. Pigment Blue 15:3 | 30% |
| Polyoxyethyleneoleylether ammoniumsulfate | 15% |
| Ethylene glycol | 30% |
| Pure water | balance |

After the above-noted ingredients were mixed, dispersion was performed in a wetted sand mill, followed by centrifugation to remove coarse particles. As a result, cyan pigment dispersion was obtained.

- Cyan Ink -

| | |
|---|---|
| Cyan Pigment Dispersion | 15% |
| Glycerin | 10% |
| 3-methyl-1,3-butanediol | 20% |
| 2-ethyl-1,3-hexanediol | 2% |
| Surfactant (1-7) $C_{13}H_{27}O(C_2H_4O)_5H$ | 1% |
| Silicone Antifoamer KS531 (Shin-Etsu Chemical Co., Ltd.) | 0.1% |
| De-ionized water | balance |

The ink ingredients of the above-noted recipe were mixed sufficiently at room temperature to produce an ink composition. Then, the resulting ink composition was filtered through a membrane filter having an average pore diameter of 1.2 μm; thereby an ink of Production Example 13 was prepared. The viscosity of the ink at 25° C. was 6.5 mPa·s.

Production Example 14

Preparation of Ink

First, pigment dispersion was prepared with the following recipe.
—Self-Dispersible Cyan Pigment Dispersion—

Seventy (70) parts of sulfolane was charged to 20 parts of C.I. Pigment Blue 15:3. After the solution was heated to 120° C. in an oil bath, 10 parts of sulfamic acid was added to allow sulfonation for 5 hours. The solution was cooled and then centrifuged to remove coarse particles. As a result, self-dispersible cyan pigment dispersion was prepared.

- Cyan Ink -

| | |
|---|---|
| Self-Dispersible Cyan Pigment Dispersion | 50% |
| Glycerin | 8% |
| 1,3-butanediol | 20% |
| 2,2,4-trimethyl-1,3-pentanediol | 2% |
| Surfactant (1-7) $C_{13}H_{27}O(C_2H_4O)_5H$ | 1% |
| Silicone Antifoamer KS531 (Shin-Etsu Chemical Co., Ltd.) | 0.1% |
| De-ionized water | balance |

The ink ingredients of the above-noted recipe were mixed sufficiently at room temperature to produce an ink composition. Then, the resulting ink composition was filtered through a membrane filter having an average pore diameter of 1.2 μm; thereby an ink of Production Example 14 was prepared. The viscosity of the ink at 25° C. was 7.3 mPa·s.

Examples 17 to 20

Evaluation (5) was conducted as described above with inks of Production Examples 11 to 14. The results are shown in Table 9.

TABLE 9

| | Ink | Intermittent Printing Examination |
|---|---|---|
| Example 17 | Production Example 11 | A |
| Example 18 | Production Example 12 | A |
| Example 19 | Production Example 13 | A |
| Example 20 | Production Example 14 | A |

The results shown in Table 9 indicate that an ink with higher reliability may be obtained by using with a self-dispersible pigmented ink.

Comparative Production Example 4

- Preparation of Black Ink -

| | |
|---|---|
| KM-9036 (Toyo Ink Mfg. Co., Ltd., self-dispersible carbon black) | 30% |
| Glycerin | 5% |
| Diethylene glycol | 15% |
| 2-ethyl-1,3-hexanediol | 2% |
| 2-pyrrolidone | 2% |
| Surfactant (1-9) $C_{13}H_{27}O(C_2H_4O)_9H$ | 1% |
| Silicone Antifoamer KS508 (Shin-Etsu Chemical Co., Ltd.) | 0.1% |
| De-ionized water | balance |

The ink ingredients of the above-noted recipe were mixed sufficiently at room temperature to produce an ink composition. Then, the resulting ink composition was filtered through a membrane filter having an average pore size of 1.2 μm; thereby an ink of Comparative Production Example 4 was prepared. The viscosity of the ink was 5.1 mPa·s, and the average particle diameter of the colorant in the ink was 100 nm.

Comparative Production Example 5

- Preparation of Black Ink -

| | |
|---|---|
| KM-9036 (Toyo Ink Mfg. Co., Ltd., self-dispersible carbon black) | 50% |
| Glycerin | 12% |
| 1,3-butanediol | 30% |
| 2-ethyl-1,3-hexanediol | 2% |
| 2-pyrrolidone | 2% |
| Surfactant (1-9) $C_{13}H_{27}O(C_2H_4O)_9H$ | 1% |
| Silicone Antifoamer KS508 (Shin-Etsu Chemical Co., Ltd.) | 0.1% |
| De-ionized water | balance |

The ink ingredients of the above-noted recipe were mixed sufficiently at room temperature to produce an ink composition. Then, the resulting ink composition was filtered through a membrane filter having an average pore size of 1.2 μm; thereby an ink of Comparative Production Example 5 was prepared. The viscosity of the ink was 15.3 mPa·s, and the average particle diameter of the colorant in the ink was 108 nm.

Comparative Examples 8 to 11

Evaluations (1) and (2) were conducted as described above with inks of Comparative Production Examples 4 and 5. The results are shown in Table 10.

TABLE 10

| | | Evaluation (1) Comparative Production Example 4 | Evaluation (1) Comparative Production Example 5 | Evaluation (2) Comparative Production Example 4 | Evaluation (2) Comparative Production Example 5 |
|---|---|---|---|---|---|
| Comparative Example 8 | Printer A | B | B | D | D |
| Comparative Example 9 | Printer B | C | B | D | D |
| Comparative Example 10 | Printer C | D | C | D | D |
| Comparative Example 11 | Printer D | D | D | C | D |

In addition, Evaluation (4) was conducted as described above with inks of Comparative Production Examples 4 and 5. The results are shown in Table 11.

TABLE 11

| Ink | Letter Bleeding | Color Boundary Bleeding |
|---|---|---|
| Comparative Production Example 4 | D | C |
| Comparative Production Example 5 | C | D |

INDUSTRIAL APPLICABILITY

An inkjet recording apparatus and inkjet recording method of the present invention may be applied to various recordings based on inkjet recording such as printers, facsimile, copier, complex apparatus of printer/facsimile/copier, for inkjet recording.

The invention claimed is:

1. An inkjet recording apparatus comprising:
an ink, and
a recording head with a filter,
wherein the ink that comprises a colorant, a humectant, a surfactant, and a wetting agent is discharged from the recording head, and
the viscosity of the ink at 25° C. is 6 mPa·s to 13 mPa·s, the volume-average particle diameter of the colorant is 5 nm to 200 nm, and the fluid resistance of the filter against the ink is $4.4 \times 10^9$ Pa·s/m$^3$ to $2.2 \times 10^{10}$ Pa·s/m$^3$ wherein the fluid resistance (R) of a filter under a pressure (P) is obtained by R=PT/V where (V) is the volume of ink flowed for a time period (T),
wherein the recording head comprises a nozzle and an ink-containing positively pressurized liquid chamber, and
wherein the nozzle and the ink-containing positively pressurized liquid chamber are in direct fluid communication.

2. The inkjet recording apparatus according to claim 1, wherein the recording ink comprises 3% by mass to 15% by mass of colorant, and 10% by mass to 40% by mass of humectant.

3. The inkjet recording apparatus according to claim 1, wherein the colorant is a pigment processed to be at least dispersible and soluble in water with no dispersant present, having at least one kind of hydrophilic group being attached to the surface of the pigment.

4. The inkjet recording apparatus according to claim 1, wherein the colorant is a pigment dispersed with at least one of surfactant and polymer dispersant.

5. The inkjet recording apparatus according to claim 1, wherein the colorant is a polymer emulsion formed by incorporating water-insoluble or hardly water-soluble color material into polymer fine particles.

6. The inkjet recording apparatus according to claim 1, wherein the humectant comprises one or more kinds of multivalent alcohols that respectively exhibit 25% by mass or more of equivalent moisture content at a temperature of 20° C. and a relative humidity of 60%.

7. The inkjet recording apparatus according to claim 6, wherein one of the multivalent alcohols is a glycerin and the content of glycerin is 20% by mass to 80% by mass of the whole humectant.

8. The inkjet recording apparatus according to claim 1, wherein the wetting agent comprises at least one polyol that exhibits a solubility of 0.2% by mass to 5.0% by mass in water at 20° C.

9. The inkjet recording apparatus according to claim 8, wherein the polyol is 2-ethyl-1,3-hexanediol.

10. The inkjet recording apparatus according to claim 8, wherein the polyol is 2,2,4-trimethyl-1,3-pentanediol.

11. The inkjet recording apparatus according to claim 1, wherein the ink comprises 2-amino-2-ethyl-1,3-propanediol.

12. The inkjet recording apparatus according to claim 1, wherein the recording head comprises multiple pressurized liquid chambers, nozzles with pore size no greater than 35 μm which communicate with the liquid chambers, ink supply channels, a transducing method for ink discharge, the filter, and an ink tank which causes negative pressure.

13. An inkjet recording apparatus according to claim 12, wherein the transducing method is any one of piezoelectric transducing method and thermoelectric transducing method.

14. An inkjet recording method that employs an inkjet recording apparatus which comprises an ink, and a recording head with a filter,
wherein the ink that comprises a colorant, a humectant, a surfactant, and a wetting agent is discharged from the recording head, and the viscosity of the ink at 25° C. is 6 mPa·s to 13 mPa·s, the volume-average particle diameter of the colorant is 5 nm to 200 nm, and the fluid resistance of the filter against the ink is $4.4 \times 10^9$ Pa·s/m$^3$ to $2.2 \times 10^{10}$ Pa·s/m$^3$ wherein the fluid resistance (R) of a filter under a pressure (P) is obtained by R=PT/V where (V) is the volume of ink flowed for a time period (T),
wherein the size of drops discharged from the nozzles is 3 pL to 40 pL, the velocity of the ejected drops is 6 m/sec to 20 m/sec, the driving frequency is 1 kHz or greater, and the resolution is 300 dpi or greater,
wherein the recording head comprises a nozzle and an ink-containing positively pressurized liquid chamber containing the ink, and
wherein the nozzle and the ink-containing positively pressurized liquid chamber are in direct fluid communication.

15. The inkjet recording method according to claim 14, wherein ink drops are discharged continuously, and multiple droplets are merged into one larger drop prior to reaching the recording medium.

* * * * *